United States Defensive Publication [19] (H) [11] T101,303

O'Shaughnessy [43] Dec. 1, 1981

[54] PROCESS FOR CASTING POLYURETHANE ARTICLES

[76] Inventor: Francis O'Shaughnessy, 5875 Honeysuckle Dr., Beaumont, Tex. 77706

[21] Appl. No.: 239,187

[22] Filed: Mar. 2, 1981

[51] Int. Cl.[3] ..... B29C 5/00

[52] U.S. Cl. ..... 264/28; 264/102; 264/331.19; 528/44

[57] ABSTRACT

A mixture of isocyanate-terminated polyurethane prepolymer made from an aliphatic diisocyanate and an approximately stoichiometric amount of a curing aromatic diamine is stored at least −5° to −25° C. until needed. It then is reheated to about 80°–120° C., at which temperature it becomes fluid and pourable. Within this temperature range the mixture has a useful life of at least about 30 minutes. Large batches of prepolymer-curing agent mixture can be prepared using existing processing equipment and techniques, analyzed and stored, then reheated and used for casting of very large articles.

11 Claims, No Sheets Drawing,

13 Pages Specification

The file of this unexamined application may be inspected and copies thereof may be purchased (849 O.G. 1221, Apr. 9, 1968).